INVENTORS
CHARLES A. HEIBERGER
LEON FISHBEIN

United States Patent Office 3,468,840
Patented Sept. 23, 1969

3,468,840
VINYL CHLORIDE-ETHYLENE COPOLYMERS AND MOLDING COMPOSITIONS CONTAINING SAID COPOLYMERS
Charles A. Heiberger, Princeton, N.J., and Leon Fishbein, New City, N.Y., assignors, by mesne assignments, to Air Reduction Company, Incorporated, New York, N.Y., a corporation of New York
Continuation-in-part of application Ser. No. 390,416, Aug. 18, 1964. This application May 27, 1965, Ser. No. 459,289
Int. Cl. C08f 15/06
U.S. Cl. 260—41      33 Claims

ABSTRACT OF THE DISCLOSURE

A vinyl chloride-ethylene copolymer containing about 2 to about 10%, preferably about 5 to about 8%, by weight of ethylene is prepared by polymerizing vinyl chloride in the presence of ethylene in a suspension polymerization system at a temperature of about 5 to about 95° C., at a pH of 3 to 11 and at a pressure to about 1000 p.s.i. The copolymer, which is further characterized by an intrinsic viscosity of about 0.5 to 150 dl./g., a melt flow rate of at least 0.5 dg./min. and a dynamic processability index of at least 150, can be combined with a lubricant and a stabilizer to form a rigid molding composition particularly adapted for blow molding to form containers, such as bottles.

CROSS-REFRENCE TO RELATED APPLICATION

Figure 1:
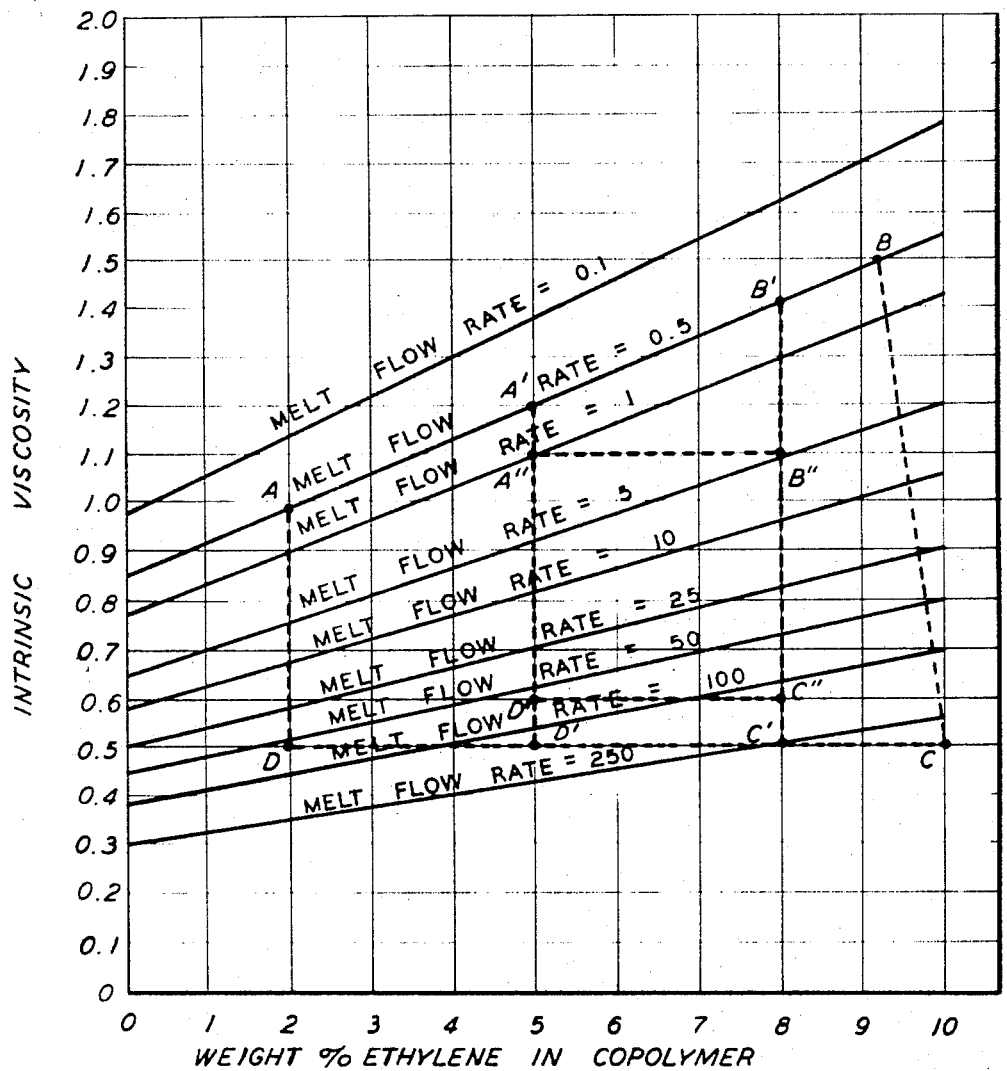

This application is a continuation-in-part of U.S. application Ser. No. 390,416 filed Aug. 18, 1964 for "Vinyl Chloride Copolymers," and now abandoned.

The present invention is concerned with rigid resinous compositions for hot molding, extrusion, thermoforming, and other hot shaping operations which compositions have improved physical properties and processing characteristics, and the invention is more particularly concerned with molding, extrusion and other formable compositions of the character indicated formed from polymers comprising vinyl chloride and ethylene, i.e. polymers produced by the polymerization of vinyl chloride in the presence of ethylene, hereinafter referred to for convenience as vinyl chloride-ethylene copolymers. The invention is also concerned with processes for the preparation of these vinyl chloride-ethylene copolymers, and with rigid shaped articles produced by the shaping of the resinous compositions under the influence of heat.

Rigid resinous compositions are defined by ASTM D883 as plastics which have a stiffness or apparent modulus of elasticity greater than 100,000 p.s.i. at 23° C., when determined in accordance with The Method of Test for Stiffness in Flexure of Plastics (ASTM D747). Vinyl chloride homopolymers are, in general, rigid materials characterized by substantial resistance to chemical attack, and are used extensively in the chemical processing industry as well as in other manufacturing applications. Thus, unplasicized rigid polyvinyl chloride resins have a combination of properties generally not obtainable with other known low cost commercial plastics, viz:

(1) Excellent resistance to water, acids, alkalies, salts, organic chemicals, and to external aging environments.
(2) Low vapor permeability to water, oxygen and many volatile organic compounds.
(3) High clarity and gloss.
(4) High modulus and physical strength.
(5) Nonflammability.
(6) Good electrical properties.

However, resinous compositions comprising rigid vinyl chloride homopolymers are difficult to mold, to extrude or to flux and mill satisfactorily on conventional equipment, i.e. they have poor flow characteristics and stability under dynamic processing conditions. This poor dynamic processability is due in part to the high melting point of the homopolymers and to the high viscosity evidenced by the polymers at temperatures above the softening point of the polymers and in the range encountered with conventional manufacturing operations of the type mentioned. Furthermore, such homopolymers tend to decompose or to degrade thermally before reaching a viscosity sufficiently low to assure the flow characteristics necessary for many manufacturing operations.

Thus, commercial applications of polyvinyl chloride rigid resin compositions have been limited and/or excluded in certain cases by practical difficulties in processing, e.g. in the extrusion and molding of end products having desired characteristics. The proximity of the glass transition temperature (below which flow is negligible) and the temperature at which the resin is unstable (discolors and degrades) not only requires close and careful control of processing conditions, but some processes, particularly injection molding, have not been possible under practical conditions, from both economic and technical considerations.

Attempts to improve the processing characteristics of polyvinyl chloride have involved the incorporation of so-called "external" plasticizers, such as dioctyl phthalate, or the formation of so-called "polyblends" with butadiene-acrylonitrile or acrylate polymers, or similar compounding ingredients, or the polyvinyl chloride has been prepared by polymerization processes which lead to a polymer of low molecular weight. These procedures, however, have ordinarily proven unsatisfactory because any improvement achieved has frequently been accomplished by an undue sacrifice of other desirable physical properties of the polymers, such as rigidity, impact toughness, heat-distortion temperature, chemical resistance and the like, or the products are economically unattractive for most applications.

For example, in the case of low molecular weight polyvinyl chloride resins, physical strength and impact toughness are severely decreased, and the resultant lower heat stability is a problem. When use is made of external plasticizers, the presence of even small concentrations of plasticizers results in lower strength and reduced toughness. Polyblends with butadiene-acrylonitrile rubbers or acrylic polymers or like materials do not give clear rigid plastics, are expensive, and degrade other properties such as weather resistance, chemical resistance, and nonflammability. In short, when attempts are made to modify the processing characteristics of polyvinyl chloride compositions, the resultant shaped products lack the desired properties.

It has also been proposed to copolymerize vinyl chloride with various comonomers, such as vinyl acetate, dioctyl fumarate, octyl acrylate and the like, but compositions having the desired dynamic processability and at the same time having the desired characteristics for making rigid products have not heretofore been successfully produced by this technique. While copolymers with vinyl acetate or dialkyl fumarates are both available commercially, these copolymers are less heat stable, less dimensionally stable, and less chemically resistant than polyvinyl chloride resins and, in addition, they comprise a more expensive resin composition.

It is accordingly an object of this invention to provide rigid resinous compositions comprising vinyl chloride polymers which avoid the disadvantages and drawbacks of vinyl chloride polymer compositions heretofore known.

In accordance with the present invention, it has now been found that vinyl chloride polymers having improved physical properties and processing characteristics, and effective to form resinous compositions for the production of rigid products, can be obtained by the polymerization of vinyl chloride with small amounts of ethylene. Such vinyl chloride-ethylene copolymers can be used in any of the applications in which conventional vinyl chloride homopolymers have heretofore been employed, as well as those previously believed precluded for such polymers, e.g. certain extrusion and injection molding operations, as well as blow-molding operations.

Thus, the present invention effectively solves the foregoing problems by providing rigid resinous compositions which have the desirable dynamic processability, including suitable heat stability, which makes them adapted for the formation of shaped products under the influence of heat without thermal decomposition, yet they are effective to produce shaped products which are truly rigid.

We have in effect discovered a family of vinyl chloride-ethylene copolymer resins which permit the preparation of rigid resinous compositions which have improved processability and improved impact toughness, yet retain the dimensional stability and other desirable properties of unmodified polyvinyl chloride rigid resinous compositions. These vinyl chloride-ethylene copolymer resins contain less than 10% by weight of ethylene but at least 2% by weight, preferably 3% to 8%, outstandingly advantageous properties with respect to the invention are exhibited by vinyl chloride-ethylene copolymers containing 5% to 8% by weight of ethylene. The vinyl chloride-ethylene copolymers contemplated by this invention also have an average molecular weight, expressed in terms of intrinsic viscosity, of 0.5 to about 1.5 dl./g., preferably 0.6 to 1.1 dl./g., with a melt flow rate of at least 0.5 dg./min. and an apparent modulus of elasticity of at least 100,000 p.s.i. at a temperature within the range from about 40° C. to about 75° C. As a general rule, the melt flow rate will be at most about 500 dg./min., preferably at most about 250 dg./min., and the above-mentioned copolymers having an ethylene content of 5% to 8% and an intrinsic viscosity of 0.6 to 1.1 dl./g., most suitably have a melt flow rate of about 1 to about 150 dg./min.

Intrinsic viscosity values referred to herein are expressed in dl./g., and are determined in conventional manner by extrapolation to infinite dilution of the reduced viscosity values at several concentrations of the polymer in cyclohexanone, as determined, for example, according to ASTM, D1243-60, Method A, but at 25° C. Weight percent ethylene in the copolymers is determined from chlorine analysis and correlated with volume percent ethylene as determined by measurements of specific gravity (ASTM D792-60T) on a standard molded composition containing 3 parts by weight of an organic tin mercaptide stabilizer (Advastab T-360) per 100 parts by weight of copolymer. Melt flow rate is determined by means of ASTM D1238-57T, condition F, for the copolymer in the above standard molded composition. The apparent modulus of elasticity is determined by means of ASTM D1043-61T and the results are expressed as $T_f$, in ° C., which is the temperature corresponding to 135,000 p.s.i. apparent modulus of elasticity. As is known, the $T_f$ value which is expressed in terms of apparent modulus of elasticity, as mentioned, corresponds approximately to the heat distortion temperature.

Heat stability can be determined in several ways. In a first method, a sample of the resin, in the form of a milled sheet composition containing 3 parts by weight of an organic tin mercaptide stabilizer (Advastab T-360), is maintained in an air oven at 400° F., and the time in minutes, after which the resin sample turns black, is noted. The change to black occurs relatively suddenly and there is no appreciable transition in color. In a second method heat stability is determined by boiling a 1% by weight solution of the copolymer in cyclohexanone at a temperature of 155° C., under reflux and under a nitrogen atmosphere, for a period of 1.5 hours. The optical density of the solution contained in a one centimeter spectral cell is then measured at 460 millimicrons, using an ultraviolet spectrometer. The optical density of the solution thus obtained is a direct measure of the dehydrochlorination which has occurred during the heating of the polymer, with low optical density values indicating a polymer having high heat stability and, conversely, high optical density values indicating a polymer having poor heat stability.

Thus, the vinyl chloride-ethylene copolymers can be characterized as having composition-melt flow relationships falling substantially within the area delineated by the points A, B, C, and D, of FIG. 1 of the attached drawings. Similarly, the copolymers having the advantageous ethylene content of above 5% to about 8% can be characterized as having composition-melt flow relationships falling substantially within the area delineated by the points A', B', C', and D', of FIG. 1, and the copolymers which have the most suitable combination of intrinsic viscosity and melt flow characteristics, with the last-mentioned ethylene content, fall within the area delineated by the points A", B", C", and D". The reference above to apparent modulus of elasticity of at least 100,000 p.s.i. at a temperature within the range from about 40° C. to about 75° C., serves to characterize the copolymers as rigid resinous materials within the standard definition, to distinguish them from non-rigid resinous materials, and as long as the copolymers meet this minimum value they are suitable for use where rigid compositions are desired.

In the accompanying FIG. 1, compositions having equal "melt" flow rates are shown as functions of intrinsic viscosity and weight percent ethylene in the copolymer resins. Flow rates at 0% ethylene correspond to data obtained on vinyl chloride homopolymers. By appropriate selection of intrinsic viscosity and ethylene content, copolymers can be prepared to any specified flow rate for optimum processability and physical properties in the fabrication of rigid plastic products. The "melt" flow rate is measured in accordance with ASTM D1238-57T condition F for each copolymer in the above standard molded composition. These data have been analyzed by computer techniques to show the following interrelationship:

$$\log FR = 3.957 - \frac{(5.079n)}{(1+0.082E)}$$

where

FR=flow rate in dg./min.
$n$=intrinsic viscosity in dl./g.
E=weight percent ethylene By reference to FIG. 1, it can be seen that the novel copolymers of this invention can be prepared either with flow rates equal to vinyl chloride homopolymers but at higher intrinsic viscosities, with corresponding improvements in impact toughness and other physical properties, or at intrinsic viscosities equal to vinyl chloride homopolymers, with substantial improvement in flow rate and processing characteristics, or at intermediate intrinsic viscosities, with improvement in both flow rate, processability, and physical properties.

In an oven stability test described above, vinyl chloride-vinyl acetate copolymer resins have been found to run less than 15 minutes at 400° F. before first evidence of black discoloration, whereas the vinyl chloride-ethylene copolymer compositions contemplated by this invention run typically from 30 to 35 minutes.

Thermal stability tests by the second described method, where low optical density indicates high stability and low degree of dehydrochlorination in boiling cyclohexanous solution, gave the following results when typical vinyl chloride-ethylene copolymers were compared with well known vinyl chloride homopolymers:

| Resins | Ethylene (wt. percent) | Intrins. visc. (dl./g.) | Optical density |
|---|---|---|---|
| Geon 103EP | | 0.93 | 0.85 |
| Vygen 85 | | 0.83 | 0.87 |
| Bakelite QYSA | | 0.63 | 1.05 |
| VC-E copolymer | 4.7 | 0.79 | 0.37 |
| VC-E copolymer | 4.9 | 0.96 | 0.38 |
| VC-E copolymer | 7.5 | 0.59 | 0.33 |
| VC-E copolymer | 4.6 | 0.81 | 0.34 |

As a group the vinyl chloride-ethylene copolymers characteristically have optical density values well below 0.6, and generally below 0.4, as evidenced by the copolymers above.

The vinyl chloride-ethylene copolymers with which this invention is concerned can also be characterized in terms of their dynamic behavior when tested in a standard Brabender plastograph. This well known instrument is described, for example, in "Kunststoffe," Vol. 54, pp. 169–177 (March 1964), and is, in effect, a miniature Banbury mixer. In making the determination of the dynamic properties of the vinyl chloride-ethylene copolymers, the standard Brabender plastograph (60 ml. bowl) is operated at a fixed bowl temperature of 375° F. and at 63 r.p.m. to provide standard differential speeds of 63 and 95 r.p.m. of the sigma blade mixing arms, i.e. one arm rotating at 63 r.p.m. and the other arm rotating at 95 r.p.m. The standard test specimen subjected to test in the Brabender plastograph is a composition consisting of the resin compounded with 3 parts per hundred of the standard stabilizer Mark 292 (alkyl tin thio glycollate) and 0.5 part per hundred of mineral oil as a standard lubricant.

Results are plotted as the torque in gram-meters against time in minutes. The test is continued until the plotted line definitely turns upwardly and continues upwardly, which indicates decomposition. Thus, the time required before decomposition is a measure of heat stability under dynamic conditions, i.e. dynamic heat stability. When the time in seconds to decomposition is divided by the torque in kilo gram-meters at decomposition, and this product is multiplied by the square of the intrinsic viscosity, there is obtained a numerical value which can be referred to as the "Dynamic Processability Index."

A series of vinyl chloride-ethylene copolymers representative of those relating to this invention having intrinsic viscosity values up to about 0.9, a commercial vinyl chloride copolymer and a commercial vinyl chloride homopolymer were evaluated in a Brabender plastograph in accordance with the previously specified conditions for testing with this instrument. The properties of the resins in the test specimens were as follows:

| Resin | | Intrins. visc. (dl./g.) | Comonomer Type | Wt. percent |
|---|---|---|---|---|
| Code: | | | | |
| A | Geon 103EP | 0.93 | None (PVC) | |
| B | VC-E copolymer | 0.88 | Ethylene | 8.7 |
| C | do | 0.64 | do | 7.7 |
| D | do | 0.67 | do | 2.7 |
| E | Bakelite VYHH | 0.52 | Vinyl acetate | 13.0 |

Figure 2:
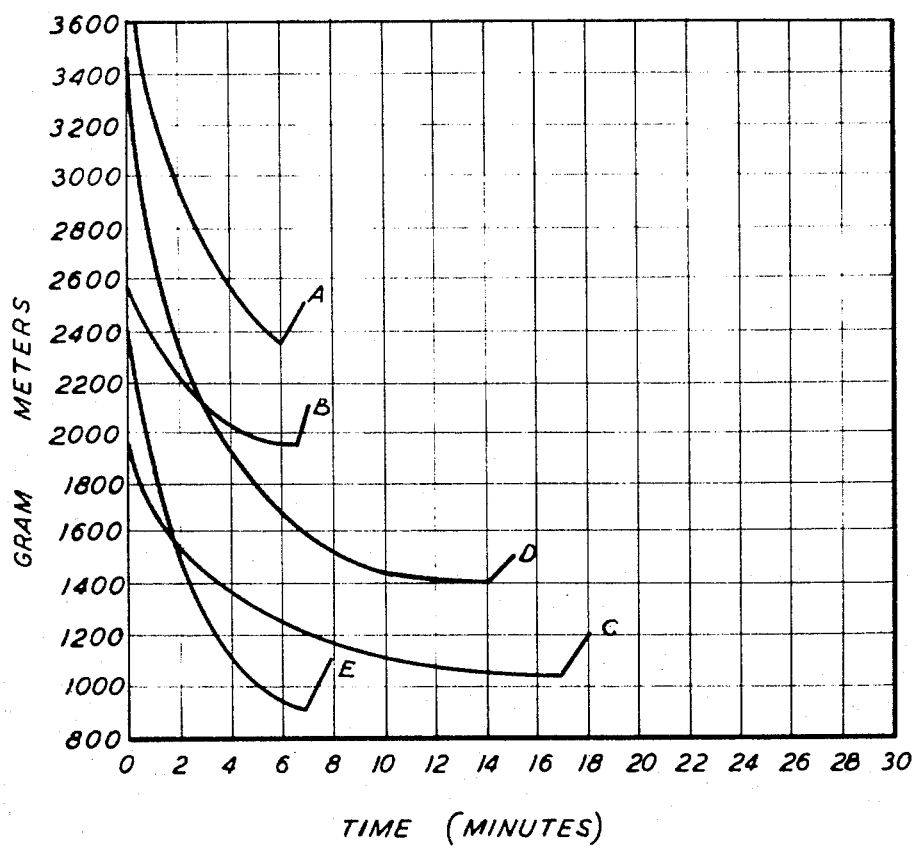

The results are shown in FIG. 2 wherein torque in grammeters (proportional to melt viscosity) is plotted as a function of time (proportional to dynamic stability). The four vinyl chloride-ethylene copolymer compositions show substantial increases in processability in comparison to commercial resins A and E, which represent extremes of low and high melt flow. By referring to FIG. 2 and to the intrinsic viscosity values in the foregoing table, it will be seen that compositions A, B, C, D, and E, have, respectively, Dynamic Processability Indices of 130, 165, 415, 270, and 125.

The "Dynamic Processability Index" of many of the copolymers with which this invention is concerned is at least 150.

The above-characterized vinyl chloride-ethylene copolymers in the form of formable compositions have properties which are unique, combining excellent processability (high melt flow characteristics which are usually 10 to 100-fold or more of those of polyvinyl chloride resins of the same molecular weight) and improved impact toughness (usually at least 50% higher than polyvinyl chloride resins of equivalent melt flow rate). Heat stability, chemical resistance, clarity, nonflammability, electrical properties, and the like, are comparable or superior to polyvinyl chloride resins. In particular, the formable resinous compositions of this invention which comprise the above-characterized vinyl chloride-ethylene copolymers can be effectively employed for making rigid structures for use in industrial and consumer containers, piping, electrical conduits, structural panels, pacakaging film, and other molded and extruded products. It will be understood that the formable compositions or compounds formed from these veinyl chloride-ethylene copolymers, e.g. molding compounds or extrusion compounds, are used in conventional particulate form, e.g. as pellets, powders, granules, and the like.

A particularly important feature of the novel copolymer compositions of this invention is the surprising and unexpected combination of desirable melt flow characteristics and desirable heat stability. In other words, these copolymers have very good dynamic processability, as above described, which permits their use in rigid resinous compositions for molding, extrusion, and other operations for which conventional vinyl chloride polymers are unsuited. Because of their good heat stability, these vinyl chloride-ethylene copolymer composition can be processed at higher temperatures with resulting low melt viscosity as compared to other conventional copolymers. Although many vinyl chloride copolymers, such as copolymers with vinyl acetate, dioctyl fumarate, octyl arcylate, etc., show high melt flow characteristics, all of these conventional copolymers are less stable to heat than the vinyl chloride-ethylene copolymers and, therefore, have poor dynamic processability. The vinyl chloride-ethylene copolymer compositions are readily handled by conventional molding, extruding, coating, and like machinery, by reason of their properties at the temperatures employed in such apparatus.

When the above described vinyl chloride-ethylene copolymer resins are employed in rigid resinous compositions, they suitably have added to them stabilizers and lubricants, and they may also be compounded with fillers, pigments, and resin additives to modify properties as desired. Conventional compounding agents of a type well known in the polymer art, and particularly in connection with vinyl resins, are suitably used. For example, suitable stabilizers include the well known alkyl tin thioglycollate (Thermolite 31), di-octyl tin dilaurate, basic lead carbonate, metal phenates such as zinc, lead, or tin phenate, and barium n-nonyl phenate, fatty acid soaps of lead, cadimum, barium, calcium, magnesium, and zinc, cadmium benzoate, triphenyl phosphite, mono-octyl diphenyl phosphite, di(epoxyethyl)benzene, epoxidized fatty oils, manganous pyrophosphite, and the like, alone or in combination. The function of various stabilizers in such polymers is well known and is described, for example, in "Polymer Processes" by Schildknecht, pages 542–548. In general, any of the many stabilizers suitable for use with polyvinyl chloride may be employed.

In like manner, conventional lubricants, such as mineral oil, fatty acids, synthetic waxes of the fatty amide and ester types, octyl stearate and calcium stearate, are used. Polymer lubricants are referred to in Schildknecht, pp. 685 et seq. The stabilizers or inhibitors and lubricants are used in varying quantities, such as described in the foregoing publication, depending upon the nature of the individual agent. For example, stabilizers are generally used in the amount of 0.5% to 5% by weight of the copolymer but the overriding criterion is the use of a small amount sufficient to effect the desired stabilization. The same considerations apply in the use of lubricants. In general, lubricants are used in amounts ranging from 0.1% to 1% or more by weight of the copolymer. In accordance with this invention, the vinyl chloride-ethylene copolymers are combined with 0.1% to 10% by weight of combined lubricant and stabilizer.

Any and all pigments commonly employed in coloring polyvinyl chloride compositions may be used, such as carbon black, titanium dioxide, phthalocyanines, and the like, depending upon the color, if any, desired in the final product.

Either fibrous or nonfibrous fillers may be employed in preparing resinous compositions comprising the novel vinyl chloride copolymers of this invention. The fibrous fillers that may be used include asbestos, glass fibers, cotton, rayon, nylon, and the mineral wools. Asbestos is the most commonly used fibrous filler. The useful nonfibrous inorganic fillers include the many materials that are commonly employed as fillers in the plastics industry. These include, for example, calcium carbonate, calcium sulfate, calcium silicate, barium carbonate, barium sulfate, silica, china clay, kaolin, fuller's earth, and magnesium silicate, as well as such pigments as titanium dioxide, lead chromate, and iron oxide. The fibrous fillers can suitably be used in amounts up to approximately 200 parts and the nonfibrous fillers in amounts up to approximately 300 parts by weight per 100 parts by weight of vinyl chloride copolymer resin.

While plasticizers are not ordinarily used in making rigid products, they can be used if desired. Any of the usual plasticizers for vinyl chloride resins may be used in the compositions of the present invention. These include, for example, dioctyl phthalate, dibutyl sebacate, tricresyl phosphate, and the like. The amount of plasticizers which can be used can vary depending on the rigidity and hardness desired.

In addition to the ingredients described, other resin additives, such as extenders, solvents, binders, and the like, may be present in the amounts ordinarily employed in the polyvinyl chloride art.

It is sometimes desirable to compound the vinyl chloride-ethylene copolymer resin with other resinous materials which have a modifying effect upon the copolymer resin. Examples of resinous materials suitable for this purpose include polyvinyl chloride, vinyl chloride-vinyl acetate copolymer and other vinyl chloride copolymers, chlorinated polyolefins, chlorinated polyvinyl chloride and chlorinated vinyl chloride copolymers, acrylonitrile-butadiene-styrene polymers, acrylonitrile-butadiene copolymers, alkyl acrylate-methacrylate copolymers such as polymers containing ethyl acrylate and methyl methacrylate, vinyl acetate-ethylene copolymers, and chlorinated paraffin waxes. Such modifying resinous materials can be used in various amounts but ordinarily in relatively minor proportions, e.g. less than the weight of the vinyl chloride copolymer resin, preferably less than 50% by weight of the vinyl chloride copolymer resin, most preferably 10% to 25%.

Thus the formable rigid resinous compositions of this invention which can be formed from the novel vinyl chloride-ethylene copolymers characterized above can be defined as comprising from about 50.0% to 99.9% by weight of the vinyl chloride-ethylene copolymer, from about 0.1% to 10.0% by weight of combined stabilizer and lubricant, and from about 0% to 49.9% by weight of polymeric modifiers. These polymeric modifiers are suitably selected from the group consisting of (a) vinyl chloride polymers, (b) chlorinated vinyl chloride polymers, (c) chlorinated paraffin wax, (d) chlorinated polyolefins, (e) acrylonitrile-butadiene-styrene polymers, (f) acrylonitrile-butadiene copolymers, (g) alkyl acrylate-methacrylate copolymers, and (h) vinyl acetate-ethylene copolymers.

In other words, when polymeric modifiers are not present the formable rigid resinous compositions of this invention are characterized as comprising from about 90.0% to 99.9% by weight of the vinyl chloride-ethylene copolymer and from about 0.1% to 10.0% by weight of combined stabilizer and lubricant.

It will be understood that the rigid resinous compositions of this invention, e.g. molding compounds or extrusion compounds, comprising the vinyl chloride-ethylene copolymers having the specified characteristics are suitably employed in practice in conventional particulate form, e.g. as pellets, powders, granules, and the like. It will also be understood that in forming the rigid resinous compositions of the invention, the components which are combined with the vinyl chloride-ethylene copolymers may serve more than one function. For example, it is well known that some stabilizers have appreciable lubricating properties, or that some socalled lubricants are also effective stabilizers. Calcium stearate is a typical example of an additive suitably used in forming our rigid resinous compositions, which functions both as a lubricant and a stabilizer, although it is a relatively weak stabilizer. Accordingly, while the compositions are defined as comprising the vinyl chloride-ethylene resin, a stabilizer, and a lubricant, it will be understood that a single additive can meet the stabilizer and lubricant requirements, and that two different additives are not always required. The same is true of other additives; thus a modifying resinous material may also serve as a plasticizer, and a filler may serve as a pigment, and the like.

In all cases, the vinyl chloride-ethylene copolymer has the characteristics set forth above, combining ethylene content, average molecular weight (intrinsic viscosity), melt flow rate, apparent modulus of elasticity, and is characterized by having the above-mentioned Dynamic Processability Index.

The novel vinyl chloride-ethylene copolymers of this invention are effectively produced by a process which does not require the use of high pressures or elevated temperatures, and thus can be carried out in relatively inexpensive, conventional polymerization equipment. Canadian Patent No. 674,142 dated Nov. 12, 1963, described a process for making vinyl chloride-ethylene copolymers containing a very minor amount of ethylene, e.g. a maximum of less than 5%, but the process of the Canadian patent is characterized by the use of extremely high pressures, e.g. pressures of at least 20,000 pounds per square inch, so that very special, expensive, equipment is required for carrying out that process. We have discovered that, surprisingly, the copolymers of our invention can be produced, as mentioned, at the relatively low pressure of 100 to 1000 pounds per square inch, and that it is not necessary to elevate the temperature of polymerization. Thus, temperatures of 5° C. to 95° C. are suitably used, and the most preferable temperatures lie in the range of 20° C. to 75° C.

Figure 3:
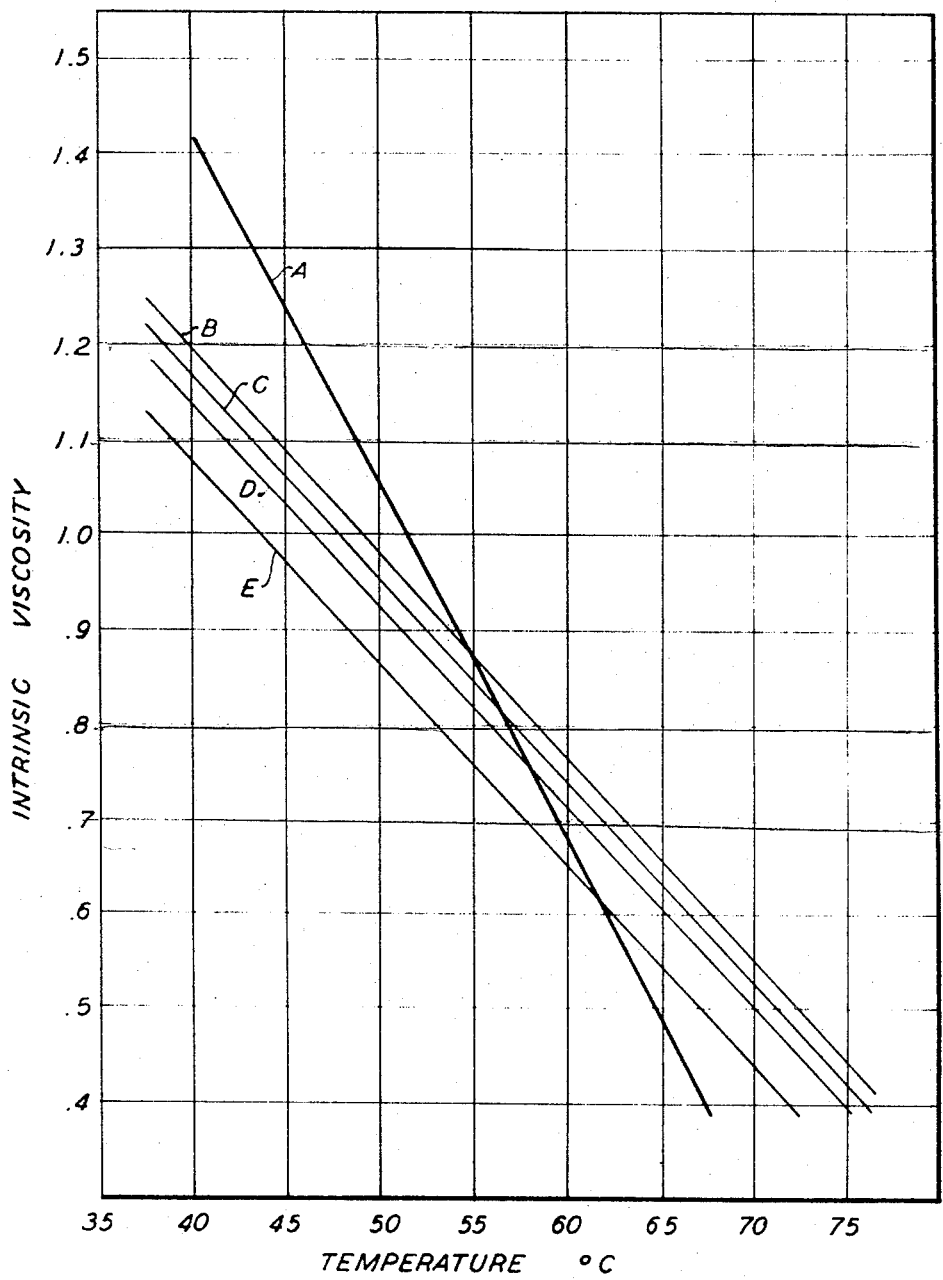

While the temperatures employed to produce these copolymers are generally in the range of 20° C. to 75° C., as is the case with the homopolymerization of vinyl chloride, the molecular weight (as measured by intrinsic viscosity) of vinyl chloride-ethylene copolymers prepared at the lower reaction temperature is significantly lower than the molecular weight of vinyl chloride homopolymers or, for example, vinyl chloride-vinyl acetate copolymers prepared at the same temperature. In FIG. 3 are shown typical relationships of the intrinsic viscosities of vinyl chloride homopolymers and vinyl chloride-ethyleene copolymers, prepared by a batch process, and the reaction temperature at which they were prepared. Curve A of FIG. 3 illustrates the conventional relationship of intrinsic viscosity to reaction temperature for vinyl chloride homopolymers prepared with 0.2% lauroyl peroxide as catalyst. Curves B, C, D, and E show some typical relationships for various batch copolymerizations of vinyl chloride and ethylene at various ratios of ethylene to total monomers fed to the system. In Curve B, the copolymers represented were prepared from 95% vinyl chloride and 5% ethylene, and polymerization was effected with about 0.35 lauroyl peroxide at a 3–3.5 to 1 water to total monomer ratio. In Curves C–E the polymerization conditions were the same as those specified for Curve B, but the ratios of vinyl chloride to ethylene were varied. Thus, in Curve C the copolymers represented were prepared from 92% vinyl chloride and 8% ethylene. Curve D is representative of a 89% vinyl chloride-11% ethylene monomer feed, and Curve E is representative of a 79% vinyl chloride-21% ethylene monomer feed.

It will be seen from FIG. 3 that the molecular weight of the vinyl chloride-ethylene copolymers as measured by intrinsic viscosity, is influenced by the amount of ethylene charged to the batch. It has been found that in order to prepare vinyl chloride-ethylene copolymers of high intrinsic viscosity, it is necessary to prepare the copolymers at lower temperatures than are conventional for equivalent molecular weight vinyl chloride homopolymers.

The reactivity of catalysts varies, as is well known, and to insure reasonable reaction times, the more active catalysts, such as tert-butyl peroxy pivalate, are used at lower temperatures, while the less active catalysts, such as lauroyl peroxide can be used at the higher temperatures.

Furthermore, it has been found that changes in procedure that alter the relative comonomer concentrations from those found in the simple batch copolymerization technique, similarly affect the molecular weight (as measured by intrinsic viscosity) of the resultant copolymer. Delayed feeds of either comonomer, removal of some of either or both comonomers during the reaction cycle, alteration of reactor fillage, modification of water and monomer ratios, etc., all influence the resultant copolymer molecular weight as well as other polymer properties. It has been found, in general, that any process modification which tends to increase the concentration of ethylene in the polymerizing liquid monomer phase, tends to decrease the resulting copolymer molecular weight. Conversely, any process modification which tends to decrease the concentration of ethylene in the polymerizing liquid monomer phase, tends to increase the copolymer molecular weight.

The most suitable process for preparing the vinyl chloride-ethylene copolymers with which this invention is concerned is essentially of the suspension polymerization type and the monomers are copolymerized in an aqueous system, under constant agitation, in the presence of appropriate suspending and surface active agents, with the pH being advantageously maintained at a value of 3 to 11. However, other processes known to the art, such as emulsion, solution, and mass polymerization, can be employed to prepare the copolymers used in the resinous compositions of the present invention.

Various suspending agents such as those which have been disclosed for use in the suspension polymerization of vinyl chloride can be employed, and examples of suitable suspending agents include polyvinyl alcohol, methyl cellulose, e.g. the product known commercially as "Methocel," gelatin, magnesium carbonate, guar gum, silica, magnesium lauryl sulfate, and magnesium silicate. We have found, however, that particularly good results are obtained when the suspending agent is polyvinyl alcohol or methyl cellulose. When polyvinyl alcohol is used as the suspending agent, we prefer to use partially hydrolyzed polyvinyl alcohol, e.g. polyvinyl alcohol having a percent hydrolysis of 80 to 90, rather than fully hydrolyzed polyvinyl alcohol and of the type which forms solutions of medium viscosity, e.g. 30 to 50 centipoises in a 4% aqueous solution at 20° C. Commercial forms of such polyvinyl alcohol are exemplified by the products known as "Elvanol 50–42," "Gelvatol 20–90," and "Vinol 540." Both "Elvanol 50–42" and "Gelvatol 20–90" are medium viscosity polyvinyl alcohols, having viscosities of 35 to 45 centipoises in a 4% aqueous solution at 20° C., and a percentage hydrolysis of 86% to 89%. "Vinol 540" is a polyvinyl alcohol having a viscosity of about 40 centipoises in a 4% aqueous solution at 20° C., and a percentage hydrolysis of about 87% to 89%. It will be understood however, that other grades of polyvinyl alcohol can be used.

Suitable as catalysts are the organic peroxides, such as lauroyl peroxide, tert-butyl peroxypivalate, di-isopropyl peroxydicarbonate, 2,4-dichlorobenzoyl peroxide, and benzoyl peroxide, the inorganic peroxides, such as potassium persulfate, or the azo-nitrile catalysts, such as disclosed in Hunt U.S. Patent No. 2,471,959, e.g. azo-bis-isobutyronitrile, which is conventionally referred to in the art as "AZN." Also suitable are the well known Redox catalyst systems, described, for example, in "Fundamental Principles of Polymerization" by G. F. D'Alelio (John Wiley and Sons, Inc., New York, 1952), pp. 333 et seq., Also suitable is the use of a water-soluble promoter such as sodium bisulfite, in combination with an oil-soluble free radical catalyst.

The quantity of suspending agent can vary widely, but most suitably it is present in the amount of 0.01% to 0.5% by weight based upon the total quantity of monomers in the aqueous system, preferably 0.05% to 0.2% by weight. Similarly, the quantity of catalyst can vary, but best results are obtained when the catalyst is present in the amount of 0.01% to 10.0% by weight based upon the monomers, preferably 0.1% to 1.0% by weight.

The aqueous suspension polymerization system also may advantageously include a wetting agent in the amount of 0.001% to 1.0% by weight of the monomers, preferably 0.005% to 0.05% by weight. Any of the many wetting agents used in suspension polymerization systems may be employed, but most preferably the wetting agent is sodium di-octyl sulfosuccinate, e.g. the product sold commercially as "Aerosol-OT."

In order to maintain the pH of the suspension system within the range of 3.0 to 11.0, there is suitably added an alkaline buffering agent of any convenient type. Any alkaline material which is compatible with polyvinyl alcohol can be used as the buffer. The amount of buffer is that sufficient to adjust the pH of the suspension within the above-specified range. Sodium bicarbonate is a preferred buffer because of its compatibility with polyinvyl alcohol and its low cost. The amount of sodium bicarbonate used as a buffer is generally about 0.01% to 0.5% by weight, based on the monomers. Other buffers such as disodium phosphate, sodium acetate, and the like, can, however, also be used. When superior electrical properties are desired in the product, a nonmetallic buffer such as ammonium bicarbonate is preferred.

The amount of water used is that which is sufficient to accommodate the various components of the system and to support the resultant copolymer in suspension in conventional manner. Thus, ordinarily the ratio of water to total monomer is from about 1 to 1 up to about 4 to 1.

In carrying out the polymerization operation, a solution of the suspending agent and wetting agent is first prepared. This is effected by dissolving the wetting agent in sufficient water to form a solution, followed by the portionwise addition of the suspending agent, while stirring the solution vigorously. Although it is not necessary to do so, the foregoing steps are suitably carried out with the water at a slighlty elevated temperature, e.g. 75° C., and after the solution has been formed it is allowed to cool to room temperature. The foregoing solution is then diluted with enough water to form the desired volume to be charged to the polymerization vessel, and the buffering agent is dissolved in the solution.

The solution is then, in the case of batch polymerization, charged to a suitable polymerization vessel, such as an autoclave constructed to withstand pressures up to 1000 p.s.i., and the catalyst is then added to the solution. The autoclave is seated and flushed successively with nitrogen and then with vinyl chloride in vapor form. Agitation of the reactor contents is begun, and the vinyl chloride monomer and the ethylene monomer are introduced, the vinyl chloride monomer being introduced as a liquid and the ethylene monomer being introduced in gaseous form. The polymerization system is then brought to reaction temperature, e.g. 59° C. with constant agitation, and reaction is continued until the desired polymerization is achieved. The time of reaction will, of course, vary, depending upon the size of the apparatus and the volumes of the reactants employed, but ordinarily reaction times of 5 to 10 hours are generally sufficient.

The ethylene monomer, being in gaseous form is most suitably metered by weighing or by the socalled "pressure-drop" method, i.e. a previous calibration by means of a flow meter determines the pressure drop equivalent to a known volume of gas. The vinyl chloride can be added entirely at the beginning of the reaction, but it can also be added stepwise or intermittently during the course of the reaction, the rate of addition of the liquid monomer being controlled so that there is always free vinyl chloride monomer present in the reaction vessel. This can be readily determined by sampling or by other conventional means.

The ratio between the ethylene monomer and the vinyl chloride monomer is selected to provide a copolymer having the above specified content of 2% to 10% of ethylene. In general, in carrying out the polymerization method described, the ratios between the ethylene and vinyl chloride charged are such that the ethylene is present usually in at least 100% excess in relation to the ratios of the two monomers in the finished copolymer, polymerization being continued until most of the vinyl chloride charged has reacted, e.g. 85% to 95%.

While the invention has been described above in its broader terms, it will be more fully understood by reference to the following specific examples of practical application. In the examples all parts are by weight unless otherwise indicated.

Physical characteristics of the vinyl chloride-ethylene copolymer, or formable rigid resinous compositions embodying them, which may be referred to below, and which are not identified by previously mentioned testing methods, are determined by conventional standard tests.

EXAMPLE 1

A 50-gal. jacketed stainless steel autoclave was employed as the reaction vessel. Agitation was provided by a 4-bladed axial-flow impeller and combination baffle-thermowell. Agitator speed was fixed at 200 r.p.m.

Vinyl chloride and ethylene monomers, both CP grade, were employed. The vinyl chloride monomer was distilled before use, whereas the ethylene, a low oxygen content type, was used without further purification.

The polymerization mixture was composed of the following components in the proportions indicated as follows:

|  | Quantity (Parts by Weight) | Percent of Total of monomers |
|---|---|---|
| Water | 308 | 350 |
| Vinyl chloride | 78.25 | 89 |
| Ethylene | 9.75 | 11 |
| Lauroyl peroxide | 0.286 | 0.326 |
| Methyl cellulose (Methocel 90 HG 100 c.p.s.) | 0.069 | 0.078 |
| Sodium di-octylsulfosuccinate (Aerosol-OT 75% aqueous solution) | 0.0115 | 0.0131 |
| Sodium bicarbonate (buffer) | 0.035 | 0.04 |

A solution of the suspending agent and wetting agent was prepared as follows: 0.0115 part by weight of the Aerosol-OT was diluted with 6.6 parts of deionized water and heated to 80° C. with agitation, followed by the portionwise addition of the Methocel to the rapidly stirred solution. The resultant turbid solution was allowed to cool to room temperature, at which time a clear solution resulted. The sodium bicarbonate was then added, followed by the addition of 1.10 parts of the deionized water as a rinse to assure a complete transfer of the solution from its preparation vessel to the storage vessel.

The reaction vessel was then charged with deionized water, catalyst, and the aqueous suspending agent, wetting agent, buffer, and 3.20 parts deionized rinse water. The reactor was at 100% of its jacketed working volume. The reactor was then sealed and flushed out successively with nitrogen and vinyl chloride vapor. Distilled vinyl chloride was added as a liquid, after which stirring was commenced, followed by the addition of gaseous ethylene by weight. The pressure was allowed to fall 150–200 p.s.i. before heating was begun. Then the reactants were brought to a reaction temperature of 155° F. over an 80 min. period and allowed to react for 4–5 hours at a pressure of 375–500 p.s.i.g. The temperature of the reaction mixture was then lowered to a maximum 115° F., and the excess monomers vented off. The product was centrifuged and dried in a tumbling vacuum dryer at a jacket temperature of 85° C. (55° C. resin temperature) and 27″ Hg vacuum for approximately 3 hours. The product obtained in approximately 85% conversion (based on total monomers) was a fine, white, free-flowing powder with a moisture content of 0.02%, contained about 4.7% ethylene and 95.3% vinyl chloride by weight, and had an intrinsic viscosity of about 0.60.

Using corresponding procedures, other vinyl chloride-ethylene copolymers were prepared by varying the weight percent of ethylene, the reaction temperature, or the catalyst or buffer.

Typical data for these compolymers and for conventional vinyl chloride homopolymer and copolymer compositions, each containing 3% by weight of T-360 stabilizer (tin mercaptide), are shown in Table I. In Table I the weight percent of ethylene or other comonomer is indicated in each case. Examples 2 and 9 were carried out with tertiary butyl peroxypivalate (sold commercially under the name Luperson 11) as catalyst, and in Example 11 ammonium chloride was used as the buffer. The following abbreivations are used:

E=ethylene; VAc=vinyl acetate; DOF=dioctyl fumarate; and VC=vinyl chloride.

TABLE I

| Resin Identification | Geon 103EP | Blacar H315/65 | Vygen 85 | QYSA | VYNS | VYHH | Ex. 2 | Ex. 3 | Ex. 4 | Ex. 5 | Ex. 6 | Ex. 7 |
|---|---|---|---|---|---|---|---|---|---|---|---|---|
| Comonomer | None | DOF | None | None | VAc | VAc | E | E | E | E | E | E |
| Comonomer Quantity, wt. percent | | 15 | | | 10 | 13 | 4.3 | 2.7 | 3.5 | 3.1 | 8.7 | 4.0 |
| Intrinsic Viscosity | 9.96 | 0.88 | 0.83 | 0.63 | 9.63 | 0.52 | 1.16 | 0.98 | 0.92 | 0.89 | 0.88 | 0.86 |
| Melt Flow Rate, dg./min | 0.07 | 9.5 | 0.22 | 4.3 | 26.5 | 152 | 0.7 | 0.7 | 1.0 | 2.8 | 13.3 | 9.6 |
| Izod Impact Strength: | | | | | | | | | | | | |
| Ft. lbs./in. notch, Avg | 1.0 | 0.6 | 0.9 | 0.5 | 0.5 | 0.25 | 1.4 | 1.5 | 1.0 | 1.6 | 0.8 | 1.0 |
| Ft. lbs./in. notch, Max | | 0.7 | | | 0.6 | 0.3 | 1.7 | 2.0 | 1.4 | 1.7 | 1.1 | 1.2 |
| Heat Stability, Minutes ±5 at 400° F. to black | 40 | <15 | 35 | 35 | <15 | <15 | >45 | 40 | 35 | 35 | 35 | 30 |
| $T_f$, ° C | 78 | 51 | 76 | 73 | 69 | 64 | 66 | 69 | 65 | 66 | 49 | 62 |

| Resin Identification | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|
| Comonomer | E | E | E | E | E | E | E | E | E | E |
| Comonomer Quantity, wt. percent | 3.8 | 4.6 | 5.2 | 4.0 | 3.9 | 5.5 | 7.8 | 7.7 | 4.7 | 7.4 |
| Intrinsic Viscosity | 0.81 | 0.81 | 0.78 | 0.74 | 0.76 | 0.77 | 0.69 | 0.64 | 0.60 | 0.59 |
| Melt Flow Rate, dg./min. | 6.5 | 13.8 | 18.2 | 3.2 | 9.1 | 20.7 | 65.6 | 128 | 70.4 | 197 |
| Izod Impact Strength: | | | | | | | | | | |
| Ft. lbs./in. notch, Avg | 1.1 | 0.7 | 1.2 | 1.0 | 0.8 | 0.4 | 0.4 | 0.4 | 0.4 | 0.3 |
| Ft. lbs./in. notch, Max | 1.3 | 0.8 | 1.4 | 1.1 | 1.2 | 0.6 | 0.8 | 0.5 | 0.8 | 0.4 |
| Heat Stability, Minutes ±5 at 400° F. to black | 30 | 35 | 35 | 35 | 25 | 25 | 30 | 30 | 35 | 30 |
| $T_f$, °C | 66 | 63 | 61 | 66 | 63 | 57 | 50 | 51 | 60 | 51 |

Certain of the resins identified in Table I were tested for heat stability by the optical density method, with the following optical density values being obtained.—Vygen 85=0.87; QYSA=1.05; Ex. 6=0.13; and Ex. 9=0.34.

EXAMPLE 18

The following example illustrates the use of an azonitrile catalyst in the polymerization systems generally described above:

A 1-gal. stainless steel, jacketed autoclave was employed as the reaction vessel in which was inserted a "head" containing a thermocouple well and a single-bladed propeller agitator. Agitator speed was fixed at about 890 r.p.m. in clockwise rotation.

Vinyl chloride and ethylene monomers, both CP grade, were employed. The vinyl chloride monomer was distilled before use, whereas the ethylene monomer was used without further purification.

The polymerization mixture was composed of the following components in the proportions indicated below:

| | Quantity (Parts by Weight) | Percent of Total of Monomers |
|---|---|---|
| Water | 1,800 | |
| Vinyl chloride | 600 | 90 |
| Ethylene | 66 | 10 |
| AZN | 0.96 | 0.144 |
| Methyl cellulose (Methocel 90 HG 100 c.p.s.) | 1.0 | 0.15 |
| Sodium di-octyl sulfosuccinate (Aerosol-OT-0.75% aqueous solution) | 0.10 | 0.015 |
| Sodium bicarbonate (buffer) | 0.125 | 0.019 |

A solution of the suspending agent and wetting agent was prepared as follows: the Aerosol-OT was dissolved in 900 parts of distilled water (at approximately 75° C.) with agitation, followed by the portionwise addition of the Methocel to the rapidly stirred solution. The resultant turbid solution was allowed to cool to room temperature at which time a clear solution resulted. The aqueous solution of Methocel and Aerosol-OT was then diluted with an additional 900 parts of water, followed by the addition of the sodium bicarbonate.

The reaction vessel was then charged with the aqueous solution containing suspending agent, wetting agent and buffer. The catalyst (AZN) was added immediately before sealing. The reactor was then sealed and flushed out with nitrogen. Stirring was commenced and distilled vinyl chloride monomer added as a liquid, followed by the addition of gaseous ethylene. The reactor was about 60% full when completely charged. The reactants were brought to a reaction temperature of 56° C. over a 30–45 min. period and allowed to react for 12 hours at a pressure of 300 to 330 pounds per square inch. The reaction temperature was then lowered to approximately 30° C., and the excess monomers vented off. The product was separated on a Büchner funnel, air dried for 23 hours and then dried in a vacuum oven at 50° C. for approximately 12 hours. The product obtained in 90% conversion (based on total monomers) was a fine, white, free-flowing powder with a moisture content of les than 0.3%, contained about 4.7% ethylene and 95.3% vinyl chloride by weight, and had an intrinsic viscosity of about 0.88.

In the standard rigid composition containing 3% T-360 stabilizer, the following properties were obtained:

Melt flow rate, dg./min. _____ 5.2
Izod impact strength, ft. lbs./inch notch ____ 1.0
$T_f$, °C. _____ 62

EXAMPLE 19

The following example illustrates the use of redox catalysts in carrying out the process of this invention and in producing the novel vinyl chloride-ethylene copolymers.

A 1-gal. stainless steel, jacketed autoclave was employed as the reaction vessel in which was inserted a "head" containing a thermocouple well and a single-bladed propeller agitator. Agitator speed was fixed at about 890 r.p.m. in clockwise rotation.

Vinyl chloride and ethylene monomers, both CP grade, were employed. The vinyl chloride monomer was distilled before use, whereas the ethylene monomer was used without further purification.

The polymerization mixture was composed of the following components in the proportions indicated below:

| | Quantity (Parts by Weight) | Percent of Total of Monomers |
|---|---|---|
| Water | 1,800 | |
| Vinyl chloride | 400 | 74 |
| Ethylene | 140 | 26 |
| $K_2S_2O_8$ | 2.7 | 0.50 |
| $NaHSO_3$ | 0.53 | 0.10 |
| Methyl cellulose (Methocel 90 HG 100 c.p.s.) | 1.0 | 0.19 |
| Sodium di-octylsulfosuccinate (Aerosol-OT-0.75% aqueous solution) | 0.10 | 0.019 |
| $K_3PO_4$ (buffer) | 0.20 | 0.038 |

A solution of the suspending agent and wetting agent was prepared as follows: the Aerosol-OT was dissolved in 900 parts of distilled water (at approximately 75° C.) with agitation, followed by the portionwise addition of the Methocel to the rapidly stirred solution. The resultant turbid solution was allowed to cool to room temperature at which time a clear solution resulted. The aqueous solution of Methocel and Aerosol-OT was then diluted with an additional 900 parts of water, followed by the addition of the potassium phosphate.

The reaction vessel was then charged with the aqueous solution containing suspending agent, wetting agent and buffer. The redox catalyst components ($K_2S_2O_8$ and $NaHSO_3$) were added immediately before sealing. The reactor was then sealed and flushed out with nitrogen. Distilled vinyl chloride monomer (134 pts.) was added as a liquid, followed by the addition of gaseous ethylene to a pressure of 400 p.s.i.g. (98 pts.). Stirring was commenced during the ethylene charge. The reactor was about 50% full when completely charged. The reactants were brought to a reaction temperature of 30° over a period of a few minutes. Two additional vinyl chloride charges of 133 pts. each were made two and four hours after the initial charge. The polymerization was allowed to proceed for 12 hours at a constant ethylene pressure of 400 to 420 p.s.i. The excess monomers were vented off. The product was separated on a Büchner funnel, air dried and then dried in a vacuum oven at 50° C. for approximately 24 hours. The product obtained in approximately 87% conversion (based on total monomers) was a fine, white, free-flowing powder with a moisture content of less than 0.3%, contained 8.1% ethylene and 91.9% vinyl chloride by weight, and had an intrinsic viscosity of about 1.0.

In the standard rigid composition containing 3% T-360 stabilizer, the following properties were obtained:

Melt flow rate, dg./min. _____ 2.0
$T_f$, °C. _____ 49
Heat stability, min. to black at 400° F. _____ 35

As previously mentioned, the novel copolymers of this invention can, if desired, be blended with other polymers to obtain variations in properties. The following examples illustrate typical polymer blends which can be made, but it will be readily apparent that other blends can be formed with different qualtities of polymers, or with different polymers. However, the blending polymers previously mentioned are most suitable and give the best results.

EXAMPLE 20

This example illustrates the use of an alkyl acrylate-methacrylate resin, such as the product sold under the name Acryloid KM228, as a modifying resin. This polymer was blended with a vinyl chloride-ethylene copolymer in various proportions and the products were compared with similar blends of the Acryloid with a commercial polyvinyl chloride homopolymer known as QYSA. The vinyl chloride-ethylene copolymer had an intrinsic viscosity of 0.80, a melt flow rate of 13.3 dg./min., and contained 5.1% by weight of ethylene. The QYSA had an intrinsic viscosity of 0.63 and a melt flow rate of 4.6 dg./min. The copolymer and homopolymer compositions tested were, in each case, formulated with 0.5 phr. (parts per 100 parts of resin) stearic acid and 5 phr. of commercial stabilizers, e.g. calcium, magnesium and zinc salts of fatty acids (Argus Mark 35 and Argus QED). The modified resins and the various blends set forth below were tested for Izod impact characteristics at 23° C. To prepare the test samples, the compositions were milled on a 2-roll mill at 335° F. and molded at the same temperature. The results are shown below:

| Acryloid KM228, phr.: | Izod impact strength, ft. lbs./inch notch | |
|---|---|---|
| | QYSA Blend | E-VS Copolymer Blend |
| 0 | 0.9 | 1.5 |
| 14 | 1.7 | 19.8 |
| 18 | 2.3 | 21.1 |
| 22 | 3.1 | 21.6 |
| 27 | ¹4.0 | 22.6 |

¹ About 33 phr. Acryloid required to reach 20 ft. lbs./in. notch.

The following examples illustrate the blending of typical vinyl chloride-ethylene copolymers of this invention with other modifying or blending resins. In the following tabulation there are shown formulations of a vinyl chloride-ethylene copolymer containing 6% by weight of ethylene and having an intrinsic viscosity of 0.85 and a polyvinyl chloride homopolymer (Vygen 85) having an intrinsic viscosity of 0.83, a melt flow rate of 0.2 dg./min. and a $T_f$ value of 75° C. In the table all parts are by weight.

TABLE II

| | Ex. 21 | Ex. 22 | Ex. 2 |
|---|---|---|---|
| VC-E Copolymer | 100 | 90 | 7 |
| Vygen 85 | | 10 | 2 |
| Advastab T-360 (stabilizer) | 3 | 3 | |
| $T_f$, °C | 56.0 | 57.4 | 59. |
| Melt Flow Rate, dg./min | 20.2 | 15.2 | 12. |

Additional compositions were made with a vinyl chloride-ethylene copolymer containing 4.7% by weight of ethylene and having an intrinsic viscosity of 0.84, an acrylonitrile-butadiene-styrene copolymer (sold under the name Blendex 101) and a chlorinated polyethylene (sold under the name Plaskon 101). These formulations and their properties, including heat stability, are set forth in Table III below, wherein all parts are by weight:

TABLE III

| | Ex. 24 | Ex. 25 | Ex. 26 | Ex. 27 | Ex. 28 | Ex. 29 | Ex. 30 |
|---|---|---|---|---|---|---|---|
| VC-E Copolymer | 100 | 100 | 100 | 100 | 100 | 100 | 100 |
| Blendex 101 | | 6 | 11 | 16 | | | |
| Plaskon 101 | | | | | 6 | 11 | 16 |
| Advastab T-360 | 3 | 3 | 3 | 3 | 3 | 3 | 3 |
| $T_f$, °C | 61.3 | 62.0 | 61.0 | 63.0 | 61.3 | 60.0 | 58.0 |
| Melt flow rate, dg./min | 9.6 | 7.7 | 7.5 | 7.7 | 6.2 | 5.1 | 5.0 |
| Heat stability, minutes at 400° F. to black | 30 | 35 | 35 | 40 | 30 | 25 | 25 |

To demonstrate the actual processing characteristics of the copolymers of this invention in typical rigid compositions for molding and extrusion, there were prepared the following formulations for injection molding.

Two vinyl chloride-ethylene copolymer compositions were formulated for molding a plastic impeller, about 3.5 inch diameter with six vanes. A 4-cavity mold in an Ankerwerk screw injection machine was used in commercial production, where previous experience had indicated that an unmodified PVC homopolymer composition based on QYSA resin (intrinsic viscosity=0.63; melt flow rate=4.3 dg./min.) had insufficient flow to mold satisfactorily. Instead, a commercial acrylic-modified compound was used. These formulations, which are set forth in Table IV below, were dry blended in a biconical mixer, extruded into ⅛ in. rods and ground to provide a pelletized feed for the molding machine. All three compounds molded well. The acrylic-modified standard and copolymer formulations, both standard and copolymer, had lower melt flow rates, but these values cannot be compared to flow rates of unmodified rigids except at low shear rates below about 10 sec.⁻¹.

TABLE IV

| | Ex. 31 | Ex. 32 | Ex. 33 |
|---|---|---|---|
| QYSA Homopolymer | 100 | | |
| VC-E Copolymer | | 100 | 100 |
| Thermolite 31 | 3.8 | 3 | 3.8 |
| Mineral Oil | 1.2 | 1 | 1.2 |
| Acryloid KM-227 | 19.0 | | 19.0 |
| Calcium stearate | 2.5 | | 2.5 |
| Resin, intrinsic viscosity | 0.63 | 0.78 | 0.98 |
| Resin, wt. percent ethylene | | 4.7 | 2.7 |
| Melt flow rate, dg./min | 15.2 | 36.1 | 2.5 |

EXAMPLE 34

To demonstrate the utility of a typical copolymer of this invention for blow molding, a formulation was prepared as in Example 32, using a vinyl chloride-ethylene copolymer of 3.1 weight percent ethylene and an intrinsic viscosity of 0.82, 3 phr. of Thermolite 31 and 1 phr. of mineral oil. This compound which had an extrusion flow rate of 13.3 dg./min., was run on a Kautex V8 blow molding machine. The extruder had a 1.6 inch diameter, 20/1 length/diameter screw and head designed for PVC, and was run at 30 r.p.m. with cylinder zone temperatures at 305 to 340° F. and die temperature at 330° F. A 15 second molding cycle with a clamping force of 1.7 metric tons was used to blow mold standard 4 oz. bottles in a highly successful manner.

A vinyl chloride-ethylene copolymer containing 5.1% by weight of ethylene and having an intrinsic viscosity of 0.80 was used for making an additional series of test samples for injection molding in an Ankerwerk screw injection machine using a standard ASTM test die consisting of 4 cavities: (1) 2" diameter disc; (2) tensile dumbbell (⅛" x ¾" x 8½" overall); (3) impact bar (½" x ½" x 2½"); and (4) heat deflection temperature bar (⅛" x ½" x 5"). The test formulations are set forth in Table V.

TABLE V

|  | Ex. 35 | Ex. 36 | Ex. 37 |
|---|---|---|---|
| VC-E Copolymer resin | 100 | 100 | 100 |
| Advastab T-360 (stabilizer) | 3 | | |
| Thermolite 31 (stabilizer) | | 3.4 | |
| Argus QED (stabilizer) | | | 2.5 |
| Argus Mark 35 (stabilizer) | | | 2.5 |
| Calcium stearate | | 2.0 | |
| Advawax 280 | 0.8 | | |
| TiO$_2$ | | 9.0 | 8.4 |
| Acryloid KM-227 | | 10.0 | |
| Melt flow rate, dg./min | 19.8 | 17.0 | 23.7 |

The following properties were determined:

TABLE VI

|  | Ex. 38 | Ex. 39 | Ex. 40 |
|---|---|---|---|
| Sp. Gr. at 23° C | 1.370 | 1.390 | 1.433 |
| Tf, ° C | 57 | 56 | 60 |
| Izod impact strength, ft. lb./inch notch | 0.9 | [1] 20.0 | 2.2 |
| Yield stress, p.s.i | 7,480 | 6,400 | 6,480 |
| Ult. tens. str., p.s.i | 5,360 | 5,270 | 5,640 |
| Ult. elongation, percent | 90 | 110 | 95 |
| Flexural str., p.s.i | 12,700 | 10,700 | 11,900 |
| Flexural modulus, at 5% elong., p.s.i | 450,000 | 420,000 | 460,000 |
| Compressive yield stress, p.s.i | 10,350 | 9,300 | 9,600 |
| Compressive yield elong., percent | 4.9 | 4.8 | 4.9 |

[1] QYSA homopolymer with 19 phr. KM-277 has an impact strength of 20.6 ft. lb./inch notch; at 10 phr. KM-227, Izod is low.

In the operations described above and in related tests, it has been found that in blends of vinyl chloride-ethylene copolymers of this invention with acrylic resin modifiers such as the Acryloid compositions referred to above, substantially less of the modifier is needed to obtain a high Izod impact resistance than in the case of a conventional polyvinyl chloride. It has been found that the Izod impact resistance suddenly increases when a certain critical "threshold" content of the modifier is present. Thus this critical threshold is much lower in the case of the vinyl chloride-ethylene copolymers of this invention than in the case of conventional polyvinyl chloride in which relatively large quantities of modifiers are needed to obtain desired high Izod impact values. This is, of course, a significant economic advantage of the vinyl chloride-ethylene copolymers described above.

EXAMPLE 41

Another composition was evaluated in the injection molding of a rigid 1 qt. container (ave. wall thickness=50 mils). The vinyl chloride copolymer had an intrinsic viscosity of 0.6, an ethylene content of 7.5% by weight, and a melt flow rate of 200 dg./min.

|  | Parts by weight |
|---|---|
| VC—E copolymer | 100 |
| Argus QED | 2 |
| Argus Mark 35 | 2 |
| Calcium carbonate | 20 |
| TiO$_2$ | 2 |

EXAMPLE 42

Molding operations were carried out in a plunger type injection molding machine and it was determined that only compositions having a high melt flow rate could be successfully molded without degradation. A typical successful molding composition embodying a vinyl chloride-ethylene copolymer having a high melt flow rate, in accordance with this invention, was as follows: 100 parts by weight of vinyl chloride-ethylene copolymer containing 4.7 weight percent ethylene, an intrinsic viscosity of 0.60 and a melt flow rate of 70.4 dg./min., 7.5 parts by weight of basic white lead carbonate, and 2 parts by weight of calcium stearate.

EXAMPLE 43

The vinyl chloride-ethylene copolymers of this invention are also effective for extrusion operations, including the extrusion of a film. An extruding composition consisting of 2 parts by weight of an organic tin mercaptide stabilizer and 100 parts by weight of vinyl chloride-ethylene copolymer containing 7.4 weight percent ethylene, an intrinsic viscosity of 0.59, and a melt flow rate of 197 dg./min., was formed into a film by extrusion casting on to a polished roll, a clear film was formed at gauges down to about 1 mil.

It will thus be apparent from the foregoing that this invention provides vinyl chloride-ethylene copolymer compositions which have a combination of properties which meet an important need in the art.

It will be apparent to those skilled in the art that various changes and modifications may be made in the embodiments described above without departing from the invention as defined in the appended claims. It is intended, therefore, that all matter contained in the foregoing description and in the drawings shall be interpreted as illustrative only and not as limitative of the invention.

We claim:

1. A method of making a rigid thermo-molded shaped article which comprises polymerizing vinyl chloride in the presence of ethylene in a suspension polymerization system to produce a polymer characterized by an ethylene content of about 3% to about 8% by weight, an average molecular weight, expressed in terms of intrinsic viscosity of about 0.6 to about 1.1 dl./g., a melt flow rate of at leat 0.5 dg./min., and an apparent modulus of elasticity of at least 100,000 p.s.i. at a temperature in the range from about 40° C. to about 75° C., incorporating in said polymer a stabilizer and a lubricant in a total amount of from about 0.1 to 10% by weight, heating said polymer to a flowable condition, shaping said polymer by a pressure-differential operation to form said shaped article, and cooling said article.

2. A method of making a rigid thermo-molded shaped article which comprises polymerizing vinyl chloride in the presence of ethylene in a suspension polymerization system to produce a polymer characterized by an ethylene content of about 3% to about 8% by weight, an average molecular weight, expressed in terms of intrinsic viscosity of about 0.6 to about 1.1 dl./g., a melt flow rate of 0.5 dg./min. to 500 dg./min., and an apparent modulus of elasticity of at least 100,000 p.s.i. at a temperature in the range from about 40° C. to about 75° C., incorporating in said polymer a stabilizer and a lubricant in a total amount of from about 0.1 to 10% by weight, heating said polymer to a flowable condition, shaping said polymer by a pressure-differential operation to form said shaped article, and cooling said article.

3. A method of making a rigid thermo-molded shaped article which comprises polymerizing vinyl chloride in the presence of ethylene in a suspension polymerization system to produce a polymer characterized by an ethylene content of about 5% to about 8% by weight, an average molecular weight, expressed in terms of intrinsic viscosity of about 0.6 to about 1.1 dl./g., a melt flow rate of at least 1 dg./min., an apparent modulus of elasticity of at least 100,000 p.s.i. at a temperature in the range from about 40° C. to about 75° C., incorporating in said polymer a stabilizer and a lubricant in a total amount of from about 0.1 to 10% by weight, heating said polymer to a flowable condition, shaping said polymer by an injection molding operation to form said shaped article, and cooling said article.

4. A method of making a rigid thermo-molded shaped article which comprises polymerizing vinyl chloride in the presence of ethylene in a suspension polymerization system at a pH of 3 to 11, at a temperature of about 5° to about 95° C., and at a pressure of up to about 1000 lb. per square inch, to produce a polymer characterized by an ethylene content of about 2% to about 10% by weight, an average molecular weight, expressed in terms of intrinsic viscosity of about 0.5 to about 150 dl./g., a melt flow rate of at least 0.5 dg./min., and an apparent modulus of elasticity of at least 100,000 p.s.i. at a temperature in the range from about 40° C. to about 75° C., incorporating in said polymer a non-toxic stabilizer and a lubricant in a total amount of from about 0.1 to 10% by weight, heating said polymer to a flowable condition, shaping said polymer to form said shaped article, and cooling said article.

5. A method of making a rigid thermo-molded shaped article which comprises polymerizing vinyl chloride in the presence of ethylene in a suspension polymerization system to produce a polymer characterized by an ethylene content of about 2% to about 10% by weight, and having a dynamic processability index of at least 150, incorporating in said polymer a stabilizer and a lubricant in a total amount of from about 0.1 to 10% by weight, heating said polymer to a flowable condition and shaping said polymer to form said shaped article, and cooling said article.

6. A rigid resinous composition adapted to be thermo-molded to provide a shaped article which comprises a polymer of vinyl chloride and ethylene and from about 0.1 to 10% by weight of a stabilizer and a lubricant, said polymer being characterized by an ethylene content of about 2% to about 10% by weight, an average molecular weight, expressed in terms of intrinsic viscosity of about 0.5 to about 1.5 dl./g., a melt flow rate of at least 0.5 dg./min., and an apparent modulus of elasticity of at least 100,000 p.s.i. at a temperature in the range from about 40° C. to about 75° C.

7. A rigid resinous composition adapted to be thermo-molded to provide a shaped article which comprises a polymer of vinyl chloride and ethylene and from about 0.1 to 10% by weight of a stabilizer and a lubricant, said polymer being characterized by an ethylene content of about 5% to about 8% by weight, an average molecular weight, expressed in terms of intrinsic viscosity of about 0.6 to about 1.1 dl./g., a melt flow rate of at least 1 dg./min., an apparent modulus of elasticity of at least 100,000 p.s.i. at a temperature in the range from about 40° C. to about 75° C.

8. A rigid resinous composition adapted to be thermo-molded to provide a shaped article which comprises a polymer of vinyl chloride and ethylene and from about 0.1 to 10% by weight of a stabilizer and a lubricant, said polymer being characterized by an ethylene content of about 5% to about 8% by weight, an average molecular weight, expressed in terms of intrinsic viscosity of about 0.6 to about 1.1 dl./g., a melt flow rate of about 1 dg./min. to about 150 dg./min., an apparent modulus of elasticity of at least 100,000 p.s.i. at a temperature in the range from about 40° C. to about 75° C.

9. A vinyl chloride-ethylene copolymer adapted to form thermo-molded compositions for the preparation of rigid shaped articles, characterized by an ethylene content of about 5% to about 8% by weight, an average molecular weight, expressed in terms of intrinsic viscosity of about 0.6 to 1.1 dl./g., a melt flow rate of at least 1 dg./min., and an apparent modulus of elasticity of at least 100,000 p.s.i. at a temperature in the range from about 40° C. to about 75° C., said vinyl chloride-ethylene copolymer being produced by polymerizing vinyl chloride in the presence of ethylene under suspension polymerization conditions at a pH of 3 to 11, at a temperature of about 5° to about 95° C. and at a pressure up to about 1000 lb. per square inch.

10. A vinyl chloride-ethylene copolymer adapted to form thermo-moldable compositions for the preparation of rigid shaped articles, characterized by an ethylene content of about 2% to about 10% by weight and a dynamic processibility index of at least 150, said vinyl chloride-ethylene copolymer being produced by polymerizing vinyl chloride in the presence of ethylene under suspension polymerization conditions at a pH of 3 to 11, at a temperature of about 5 to about 95° C. and at a pressure up to about 1000 lb. per square inch.

11. A process of making a vinyl chloride-ethylene copolymer adapted to form thermo-moldable compositions for the preparation of rigid shaped articles which comprises polymerizing vinyl chloride in the presence of ethylene under suspension polymerization conditions at a pH of 3 to 11, at a temperature of about 5° to about 95° C. and at a pressure up to about 1000 lb. per square inch, and recovering the resultant copolymer from the polymerization system, the quantity of said ethylene being selected to give an ethylene content of 2% to 10% and said copolymer being characterized by an average molecular weight, expressed in terms of intrinsic viscosity of about 0.5 to 1.50 dl./g., a melt flow rate of at least 0.5 dg./min., and an apparent modulus of elasticity of at least 100,000 p.s.i. at a temperature in the range from about 40° C. to about 75° C.

12. A process of making a vinyl chloride-ethylene copolymer adapted to form thermo-moldable compositions for the preparation of rigid shaped articles which comprises polymerizing vinyl chloride in the presence of ethylene under suspension polymerization conditions at a pH of 3 to 11 at a temperature of about 5° to about 95° C. and at a pressure up to about 1000 lb. per square inch, and recovering the resultant copolymer from the polymerization system, the quantity of said ethylene being selected to give an ethylene content of 5% to 8% and said copolymer being characterized by an average molecular weight, expressed in terms of intrinsic viscosity of about 0.6 to 1.1 dl./g., a melt flow rate of at least 1 dg./min., and an apparent modulus of elasticity of at least 100,000 p.s.i. at a temperature in the range from about 40° C. to about 75° C.

13. A formable rigid resinous composition comprising a vinyl chloride-ethylene copolymer having a composition-melt flow relationship substantially within the area delineated by the points A, B, C, and D of FIG. 1 of the attached drawings.

14. A formable rigid resinous composition comprising a vinyl chloride-ethylene copolymer having a composition-melt flow relationship substantially within the area delineated by the points A', B', C', and D' of FIG. 1 of the attached drawings.

15. A formable rigid resinous composition comprising a vinyl chloride-ethylene copolymer having a composition-melt flow relationship substantially within the area delineated by the points A", B", C", and D" of FIG. 1 of the attached drawings.

16. A particulate molding compound comprising a vinyl chloride-ethylene copolymer and from about 0.1 to 10% by weight of a stabilizer and a lubricant, said vinyl chloride-ethylene copolymer being characterized by an ethylene content of about 2% to about 10% by weight, an average molecular weight, expressed in terms of intrinsic viscosity, of about 0.5 to about 1.5 dl./g., a melt flow rate of at least 0.5 dg./min., and an apparent modulus of elasticity of at least 100,000 p.s.i. at a temperature within the range from about 40° C. to about 75° C.

17. A particulate blow-molding compound comprising a vinyl chloride-ethylene copolymer and from about 0.1 to 10% by weight of a stabilizer and a lubricant, said vinyl chloride-ethylene copolymer being characterized by an ethylene content of about 5% to about 8% by weight, an average molecular weight, expressed in terms of intrinsic viscosity, of about 0.6 to about 1.1 dl./g., a melt flow rate of at least 1 dg./min., and an apparent modulus 18. A particulate molding compound comprising a vinyl chloride-ethylene copolymer and from about 0.1 to 10% by weight of a stabilizer and a lubricant, said vinyl chloride-ethylene copolymer containing about 2% to about 10% by weight of ethylene and being characterized by a dynamic processability index of at least 150.

19. A particulate molding compound comprising a vinyl chloride-ethylene copolymer and from about 0.1 to 10% by weight of a stabilizer and a lubricant, said vinyl chloride-ethylene copolymer being characterized by an ethylene content of about 5% to about 8% by weight, an average molecular weight, expressed in terms of intrinsic viscosity of about 0.6 to about 1.1 dl./g., a melt flow rate of at least 1 dg./min., an apparent modulus of elasticity of at least 100,000 p.s.i. at a temperature within the range from about 40° C. to about 75° C., and a dynamic processability index of at least 150.

20. A shaped article formed from a formable rigid resinous composition comprising a vinyl chloride-ethylene copolymer and from about 0.1 to 10% by weight of a stabilizer and a lubricant, said vinyl chloride-ethylene copolymer being characterized by an ethylene content of about 2% to about 10% by weight, an average molecular weight, expressed in terms of intrinsic viscosity, of about 0.5 to about 1.5 dl./g., a melt flow rate of at least 0.5 dg./min., and an apparent modulus of elasticity of at least 100,000 p.s.i. at a temperature within the range from about 40° C. to about 75° C.

21. A shaped article formed from a formable rigid resinous composition comprising a vinyl chloride-ethylene copolymer and from about 0.1 to 10% by weight of a stabilizer and a lubricant, said vinyl chloride-ethylene copolymer being characterized by an ethylene content of about 5% to about 8% by weight, an average molecular weight, expressed in terms of intrinsic viscosity, of about 0.6 to about 1.1 dl./g., a melt flow rate of at least 1 dg./min., and an apparent modulus of elasticity of at least 100,000 p.s.i. at a temperature within the range from about 40° C. to about 75° C.

22. A container formed by blow-molding a particulate blow-molding compound comprising a vinyl chloride-ethylene copolymer and from about 0.1 to 10% by weight of a stabilizer and a lubricant, said vinyl chloride-ethylene copolymer being characterized by an ethylene content of about 2% to about 10% by weight, an average molecular weight, expressed in terms of intrinsic viscosity, of about 0.5 to about 1.5 dl./g., a melt flow rate of at least 0.5 dg./min., and an apparent modulus of elasticity of at least 100,000 p.s.i. at a temperature within the range from about 40° C. to about 75° C.

23. A method of making a shaped article which comprises forming a rigid resinous composition comprising a vinyl chloride-ethylene copolymer and from about 0.1 to 10% by weight of a stabilizer and a lubricant, said vinyl chloride-ethylene copolymer being characterized by an ethylene content of about 2% to above 10% by weight, an average molecular weight, expressed in terms of intrinsic viscosity, of about 0.5 to about 1.5 dl./g., a melt flow rate of at least 0.5 dg./min., an apparent modulus of elasticity of at least 100,000 p.s.i. at a temperature within the range from about 40° C. to about 75° C. and a dynamic processability index of at least 150, heating said composition to a flowable state, shaping the flowable composition into a shaped article, and cooling said article.

24. A method of making a container which comprises forming a rigid resinous composition comprising a vinyl chloride-ethylene copolymer and from about 0.1 to 10% by weight of a non-toxic stabilizer and a lubricant, said vinyl chloride-ethylene copolymer being characterized by an ethylene content of about 5% to about 8% by weight, an average molecular weight, expressed in terms of intrinsic viscosity, of about 0.6 to about 1.1 dl./g., a melt flow rate of at least 1 dg./min., and an apparent modulus of elasticity of at least 100,000 p.s.i. at a temperature within the range from about 40° C. to about 75° C., heating said composition to a flowable state, shaping the flowable composition into a container, and cooling said container.

25. A shaped article formed from a formable rigid resinous composition comprising a vinyl chloride-ethylene copolymer and from about 0.1 to 10% by weight of a stabilizer and a lubricant, said vinyl chloride-ethylene copolymer being characterized by an ethylene content of about 3% to about 8% by weight, an average molecular weight, expressed in terms of intrinsic viscosity, of about 0.5 to about 1.5 dl./g., a melt flow rate of 1 dg./min. to 150 dg./min., and an apparent modulus of elasticity of at least 100,000 p.s.i. at a temperature within the range from about 40° C. to about 75° C.

26. A container formed by blow-molding a particulate blow-molding compound comprising a vinyl chloride-ethylene copolymer and from about 0.1 to 10% by weight of a stabilizer and a lubricant, said vinyl chloride-ethylene copolymer being characterized by an ethylene content of about 3% to about 8% by weight, an average molecular weight, expressed in terms of intrinsic viscosity, of about 0.55 to about 0.95 dl./g., a melt flow rate of 1 dg./min. to 150 dg./min., and an apparent modulus of elasticity of at least 100,000 p.s.i. at a temperature within the range from about 40° C. to about 75° C.

27. A molding composition for the manufacture of rigid polyvinyl chloride resin containers for the packaging of foods comprising a polyvinyl chloride resin containing vinyl chloride and ethylene in an amount by weight from 5% to 8% and having an average molecular weight expressed in terms of intrinsic viscosity of from 0.6 to 1.1 dl./g., a melt flow rate of 1 to 150 dg./min., and an apparent modulus of elasticity of at least 100,000 p.s.i. at a temperature within the range of from about 40° C. to about 75° C., a non-toxic stabilizer in an amount of from about 0.5% to 5% by weight of the resin and an effective amount of a molding lubricant, said molding composition being characterized by the fact that it can be blow molded at a temperature within the range from about 250° F. to about 450° F. to form a container without the formation of decomposition products resulting from the decomposition of said resin during the molding operation.

28. A process of preparing a vinyl chloride-ethylene copolymer characterized by an ethylene content of about 5 to about 8% by weight, and an average molecular weight expressed in terms of intrinsic viscosity, of about 0.6 to 1.1 dl./g., which comprises polymerizing vinyl chloride in a suspension polymerization system in the presence of ethylene and a free-radical polymerization catalyst at a temperature of 5 to 95° C. and at a pressure of at most about 1000 lb. per square inch.

29. A vinyl chloride-ethylene copolymer characterized by an ethylene content of about 5 to about 8% by weight, and an average molecular weight, expressed in terms of intrinsic viscosity, of about 0.6 to 1.1 dl./g.

30. A vinyl chloride-ethylene copolymer characterized by an ethylene content of about 5 to about 8% by weight, an average molecular weight, expressed in terms of intrinsic viscosity, of about 0.6 to 1.1 dl./g., a melt flow rate of at least 1 dg./min., and an apparent modulus of elasticity of at least 100,000 p.s.i. at a temperature in the range from about 40° C. to about 75° C.

31. A vinyl chloride-ethylene copolymer characterized by an ethylene content of about 5 to about 8% by weight and a dynamic processability index of at least 150.

32. A vinyl chloride-ethylene copolymer characterized by an ethylene content of at least 2% but less than 10% by weight, an average molecular weight, expressed in terms of intrinsic viscosity, of about 0.5 to about 1.5 dl./g., a melt flow rate of at least 0.5 dg./min., and an apparent modulus of elasticity of at least 100,000 p.s.i. at a temperature within the range from about 40° C. to about 75° C.

33. A vinyl chloride-ethylene copolymer as defined in claim 32, wherein the ethylene content is 3 to 8% by weight and the intrinsic viscosity is about 0.6 to about 1.1 dl./g.

References Cited
UNITED STATES PATENTS

| | | | |
|---|---|---|---|
| 2,422,392 | 6/1947 | Brubaker et al. | 260—87.5 |
| 3,112,290 | 11/1963 | Salyer | 260—87.5 |
| 2,421,408 | 6/1947 | Brookman et al. | |

FOREIGN PATENTS

| | | |
|---|---|---|
| 674,142 | 11/1963 | Canada. |
| 641,679 | 8/1950 | Great Britain. |

OTHER REFERENCES
Penn, "PVC Technology," MacLaren & Sons, Ltd., London, 1962, pp. 238 to 249, TP–986V48P4 C.2.

ALLAN LIEBERMAN, Primary Examiner

U.S. Cl. X.R.

260—45.7, 45.8, 45.75, 45.85, 45.95, 87.5

PO-1050
(5/69)

UNITED STATES PATENT OFFICE
CERTIFICATE OF CORRECTION

Patent No. 3,468,840      Dated September 23, 1969

Inventor(s) Charles A. Heiberger and Leon Fishbein

It is certified that error appears in the above-identified patent and that said Letters Patent are hereby corrected as shown below:

1. Col. 1, line 22, after "pressure" insert -- up --;
2.      line 58, before "are" insert -- they --.
3. Col. 4, line 65, change "an" to -- the --;
4.      line 75, change "anous" to -- anone --.
5. Col. 6, line 18, change "pacakaging" to -- packaging --;
6.      line 21, change "veinyl" to -- vinyl --;
7.      line 34, change "composition" to -- compositions --
8.      line 38, change "arcylate" to -- acrylate --;
9.      line 59, change "cadimum" to -- cadmium --.
10. Col. 8, line 29, after "may" insert -- also --;
11.      line 41, change "polymeriation" to -- polymerization --.
12. Col. 10, line 75, change "seated" to -- sealed --.
13. Col. 11, line 43, change "copolymer" to -- copolymers --.
14. Col. 12, line 50, change "compolymers" to -- copolymers --;
15.      line 57, change "Luperson" to -- Lupersol --.
16. Table I, line 3, first col., change "9.96" to -- 0.96 --;
17.      fifth col., change "9.63" to -- 0.63 --.
18. Col. 13, line 19, change "1-gel" to -- 1-gal --;
19.      line 71, change "les" to -- less --.
20. Col. 14, line 65, change "30°" to -- 30°C --.
21. Col. 15, line 14, change "qualtities" to -- quantities --;
22.      line 45, in Table heading, change "E-VS" to -- E-VC --.
23. Table II, last col. should read -- Ex. 23 --, -- 75 --, -- 25 --, -- 3 --, -- 59.0 --, -- 12.0 --.
24. Col. 19, line 66, change "moduls" to -- modulus --.
25. Col. 21, line 58, change "above" to -- about --.

SIGNED AND
SEALED
MAY 26 1970

(SEAL)
Attest:

Edward M. Fletcher, Jr.
Attesting Officer

WILLIAM E. SCHUYLER, JR.
Commissioner of Patents